United States Patent
Gupta et al.

(10) Patent No.: US 10,259,896 B2
(45) Date of Patent: Apr. 16, 2019

(54) SHAPE CONTROLLED PRO-CATALYST AND A SINGLE POT PROCESS FOR PREPARING THE SAME

(71) Applicant: Reliance Industries Limited, Mumbai (IN)

(72) Inventors: Virendrakumar Gupta, Navi Mumbai (IN); Sanjay Govindbhai Chauhan, Surat (IN); Hiren Manojkumar Bhajiwala, Surat (IN); Shakil Shabbir Sayyed, Latur (IN); Suketu Vakil, Mumbai (IN)

(73) Assignee: Reliance Industries Limited, Mumbai (IN)

( * ) Notice: Subject to any disclaimer, the term of this patent is extended or adjusted under 35 U.S.C. 154(b) by 0 days.

(21) Appl. No.: 15/312,303

(22) PCT Filed: May 22, 2015

(86) PCT No.: PCT/IB2015/053772
§ 371 (c)(1),
(2) Date: Nov. 18, 2016

(87) PCT Pub. No.: WO2015/177761
PCT Pub. Date: Nov. 26, 2015

(65) Prior Publication Data
US 2017/0088645 A1    Mar. 30, 2017

(30) Foreign Application Priority Data
May 22, 2014   (IN) .......................... 1719/MUM/2014

(51) Int. Cl.
*C08F 110/02*   (2006.01)
(52) U.S. Cl.
CPC ................................ *C08F 110/02* (2013.01)

(58) Field of Classification Search
None
See application file for complete search history.

(56) References Cited

U.S. PATENT DOCUMENTS

| | | |
|---|---|---|
| 5,498,770 A | 3/1996 | Hosaka et al. |
| 5,556,820 A | 9/1996 | Funabashi et al. |

(Continued)

FOREIGN PATENT DOCUMENTS

| | | |
|---|---|---|
| EP | 0216402 A2 | 4/1987 |
| EP | 1739070 A1 | 1/2007 |

(Continued)

OTHER PUBLICATIONS

International Search Report issued in corresponding application No. PCT/IB2015/053772 dated Oct. 13, 2015 (3 pages).

(Continued)

*Primary Examiner* — Catherine S Branch
(74) *Attorney, Agent, or Firm* — Osha Liang LLP

(57) ABSTRACT

The present disclosure relates to a single-pot multi step process for the preparation of a shape controlled pro-catalyst. The process comprises the steps of: i. reacting magnesium metal and at least one alkanol to obtain spheroidal magnesium alkoxide; ii. treating the spheroidal magnesium alkoxide with at least one transition metal tetrahalide, at least one organic modifier, and optionally, at least one in-organic modifier in the presence of at least one solvent to obtain a reaction mixture; iii. cooling, settling the reaction mixture and decanting the supernatant; iv. adding at least one transition metal tetrahalide, at least one solvent and optionally, at least one organic or inorganic modifier; and v. iterating steps (iii) and (iv) to obtain the shape controlled pro-catalyst.

16 Claims, 4 Drawing Sheets

(56) References Cited

U.S. PATENT DOCUMENTS

Figure 1:
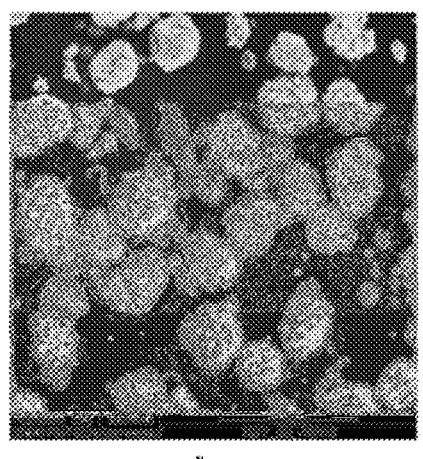
Figure 1:
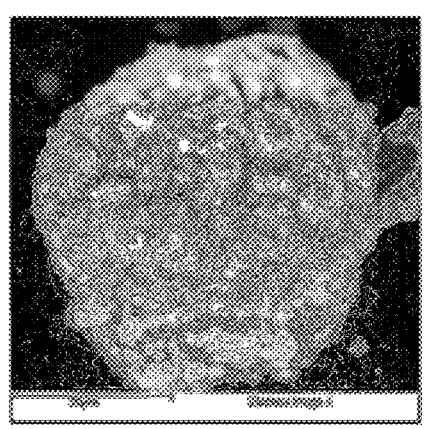
Figure 1:
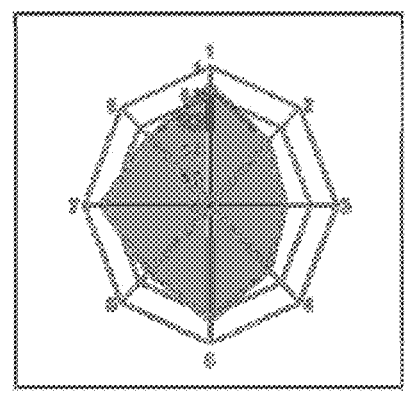

| | | | |
|---|---|---|---|
| 6,297,188 B1 | 10/2001 | Schork et al. | |
| 6,855,656 B2 * | 2/2005 | Hosaka | C08F 210/06 502/103 |
| 2004/0266609 A1 | 12/2004 | Tanase et al. | |
| 2008/0281059 A1 | 11/2008 | Tanase et al. | |
| 2009/0203857 A1 | 8/2009 | Tanase et al. | |
| 2011/0015355 A1 | 1/2011 | Gupta et al. | |
| 2011/0054129 A1 | 3/2011 | Gupta et al. | |

FOREIGN PATENT DOCUMENTS

| | | |
|---|---|---|
| WO | 2005/044873 A1 | 5/2005 |
| WO | 2012/007963 A3 | 1/2012 |

OTHER PUBLICATIONS

Written Opinion of the International Searching Authority issued in corresponding application No. PCT/IB2015/053772 dated Oct. 13, 2015 (7 pages).

\* cited by examiner

SHAPE CONTROLLED PRO-CATALYST AND A SINGLE POT PROCESS FOR PREPARING THE SAME

FIELD OF THE DISCLOSURE

The present disclosure relates to a shape controlled pro-catalyst and a process for the preparation thereof. The present disclosure also relates to a process for the preparation of polyethylene using a shape controlled pro-catalyst.

BACKGROUND

It is known that the monomers can be polymerized by using a catalyst system comprising: a compound of a transition metal such as titanium in the trivalent or tetravalent state, magnesium ethoxide as a support material and a co-catalyst of the organo-metallic type, most frequently an organo-aluminum compound.

Although these catalytic systems are active and some times result in the formation of polymers containing transition metal more than 100 parts per million by weight. For most of the applications of such polymers, it is essential to remove such catalytic residues by a special treatment.

It is also known that it is possible to increase the catalytic activity of a catalyst by pre-activation. This pre-activation treatment involves contacting the transition metal compound with magnesium and one or more alkyl halides. The pre-activation step results in a catalyst which produces polymers having acceptable physical characteristics. Further, the polymers obtained by using pre-activated catalysts are capable of being processed by injection molding or extrusion. However, polymers obtained by using a pre-activated catalyst have unacceptable residues which need to be removed.

Conventional magnesium-titanium type Ziegler-Natta catalysts use non-morphological magnesium ethoxide precursors of 700-800 micron size. The catalysts produced using these precursors results in irregular shaped particles. Polymers produced using these catalysts possess particles of irregular shape, low bulk density and broad particle size distribution.

Further, processes involving the use of magnesium-titanium type Ziegler-Natta catalysts generate fines.

Shape regularity and size distribution of polymers are dependent on shape and size of the catalyst particles as well as on the components from which the catalyst particles are synthesized. Polymers having regular shape and narrow particle size distribution are desirable for good flowability during extrusion. Several attempts have been made to prepare a catalyst system which is capable of producing polymers having regular shape, narrow particle size distribution and high molecular weight.

WO2005/044873 recites a method for synthesizing spherical magnesium alkoxide particles by reacting magnesium with alcohol mixture in the presence of iodine at a temperature below the boiling point of the mixture.

US2011/0054129A1 suggests a process for the synthesis of spheroidal magnesium alkoxide particles by reacting magnesium metal, in the presence of iodine, with a mixture of alcohols. US20040266609 suggests a process for the preparation of a pro-catalyst. In the process, magnesium metal and ethanol in the presence of iodine are heated to obtain magnesium ethoxide. The magnesium ethoxide is then treated with silicon tetrachloride, di-n-butyl phthalate and titanium tetrachloride, and stirred at 125° C. to obtain the pro-catalyst.

US20090203857, US20110054129, US5556820, WO2012007963, US20080281059 and U.S. Pat. No. 5,498,770 suggest a process for the preparation of magnesium alkoxide using magnesium metal and at least one alkanol in the presence of iodine. The magnesium alkoxide obtained is then used for the preparation of a pro-catalyst for Ziegler-Natta catalyst.

However, the spherical magnesium alkoxide particles synthesized by the method of the above processes are frangible and do not retain their morphology or particle size during the synthesis of the pro-catalyst, especially when the pro-catalyst synthesis is carried out on a large scale. Further, the particle size distribution of the magnesium alkoxide particles synthesized by the above mentioned processes need improvement.

The only process that prepares magnesium alkoxide from magnesium metal and alkanol in the absence of iodine is cited in U.S. Pat. No. 6,297,188. However, this process suffers from a drawback that only 40 w % of the coarse grains have a screening fraction of ≤500 μm.

Accordingly, there is a need for a process for preparing a shape controlled magnesium ethoxide that retains its shape not only during the synthesis of the pro-catalyst but also during the preparation of the Ziegler-Natta catalyst and the polymerization of monomers.

OBJECTS

Some of the objects of the present disclosure, which at least one embodiment herein satisfies, are as follows:

It is an object of the present disclosure to provide a single pot, simple and safe process for the preparation of a shape controlled pro-catalyst.

It is another object of the present disclosure to provide a single pot process for the preparation of a shape controlled pro-catalyst which obviates the use of iodine.

It is still another object of the present disclosure to provide a single pot process for the preparation of a stable and infrangible shape controlled pro-catalyst.

It is yet another object of the present disclosure to provide a single pot process for the preparation of a shape controlled pro-catalyst which is amenable on large scale.

It is a further object of the present disclosure to provide a modified Ziegler-Natta catalyst system comprising a shape controlled pro-catalyst.

It is still a further object of the present disclosure to provide a process for polymerization of a monomer using the pro-catalyst of the present disclosure.

Other objects and advantages of the present disclosure will be more apparent from the following description which is not intended to limit the scope of the present disclosure.

SUMMARY

In one aspect of the present disclosure there is provided a single-pot multi step process for the preparation of a shape controlled pro-catalyst; said process comprising the following steps:
  i. reacting magnesium metal and at least one alkanol to obtain spheroidal magnesium alkoxide;
  ii. treating the spheroidal magnesium alkoxide with at least one transition metal tetrahalide, at least one organic modifier and optionally, at least one in-organic modifier in the presence of at least one solvent to obtain a reaction mixture;
  iii. cooling, settling the reaction mixture and decanting the supernatant;

iv. adding at least one transition metal tetrahalide, at least one solvent and optionally, at least one organic or inorganic modifier; and v. iterating steps (iii) and (iv) to obtain the shape controlled pro-catalyst.

In accordance with another aspect of the present disclosure there is provided the pro-catalyst obtained by the process as described herein above; said pro-catalyst comprising spheroidal magnesium alkoxide having particle size in the range of 10 to 25μ, complexed with at least one transition metal tetrahalide and at least one said modifier.

The pro-catalyst can be devoid of elemental iodine and the particle size of said pro-catalyst ranges between 10 and 35μ.

In accordance with still another aspect of the present disclosure the pro-catalyst is used in preparing a catalyst system comprising:

i. a pro-catalyst comprising spheroidal magnesium alkoxide having particle size in the range of 10 to 25μ, said spheroidal magnesium alkoxide complexed with at least one transition metal tetrahalide and at least one said modifier, ii. at least one aluminium based co-catalyst, and iii. optionally, at least one external donor, wherein, said pro-catalyst is devoid of iodine and the particle size of said pro-catalyst ranges between 10 and 35μ.

In accordance with a further aspect of the present disclosure there is provided a catalyst system comprising; i. a pro-catalyst comprising spheroidal magnesium alkoxide having particle size in the range of 10 to 25μ, complexed with said transition metal tetrahalide, at least one organic and optionally at least one inorganic modifier; and ii. at least one aluminium based co-catalyst, wherein, said pro-catalyst is devoid of elemental iodine and the particle size of said pro-catalyst ranges between 10 and 35μ.

In accordance with still another aspect of the present disclosure the pro-catalyst is used in a process for the preparation of polyethylene, said process comprising the following steps:

i. mixing the pro-catalyst, at least one aluminium based co-catalyst and optionally, at least one external donor selected from the group consisting of an organo-silane compound and aromatic ester to obtain a catalyst system, and ii. polymerizing an ethylene monomer in the presence of the catalyst system to obtain polyethylene having a molecular weight in the range of 1 to 60 lac and the particle size in the range of 200 to 300μ.

BRIEF DESCRIPTION OF THE ACCOMPANYING DRAWINGS

Figure 2:
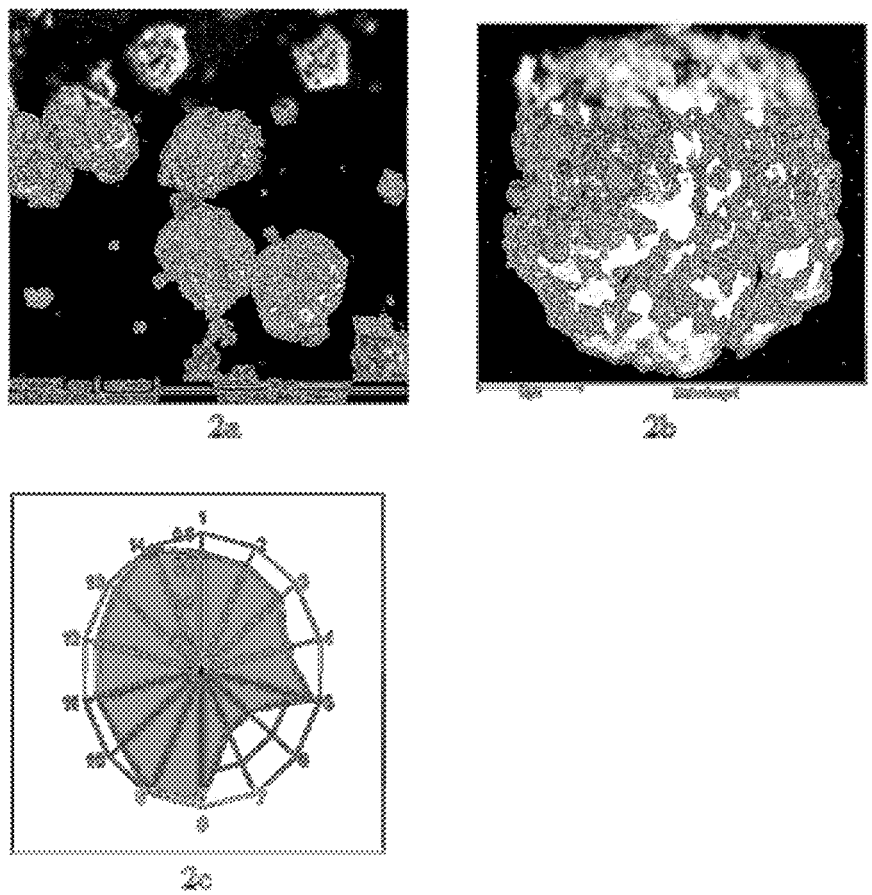
Figure 3:
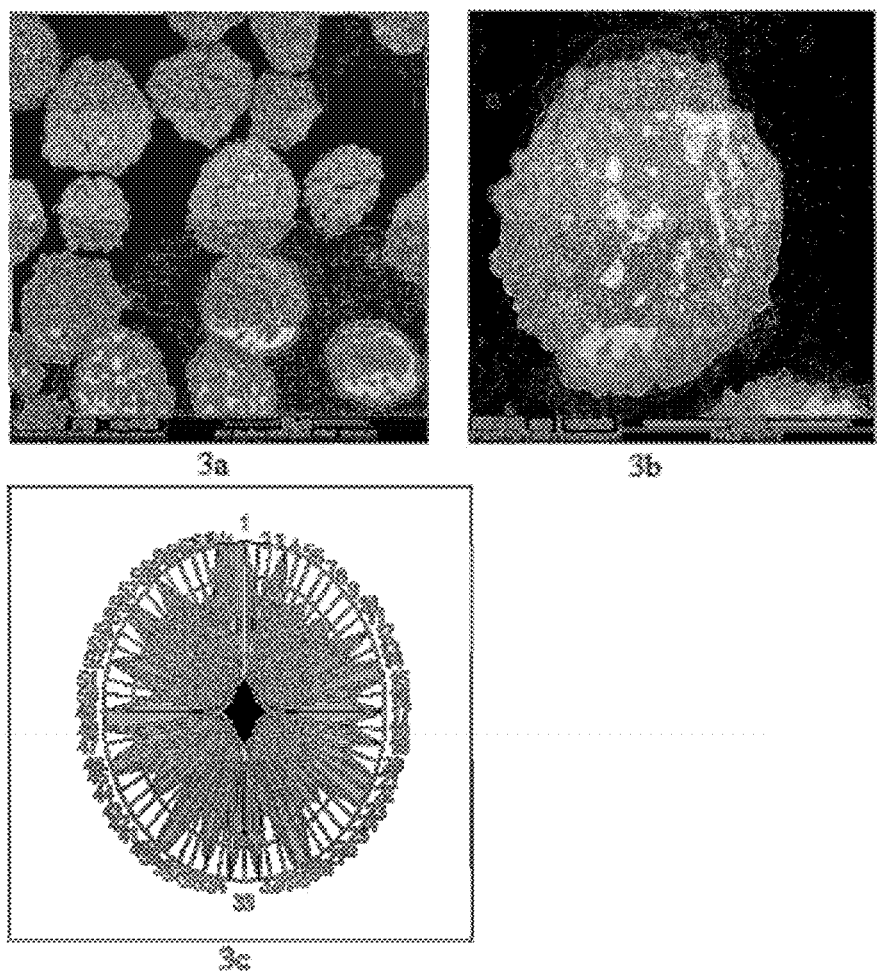
Figure 4:
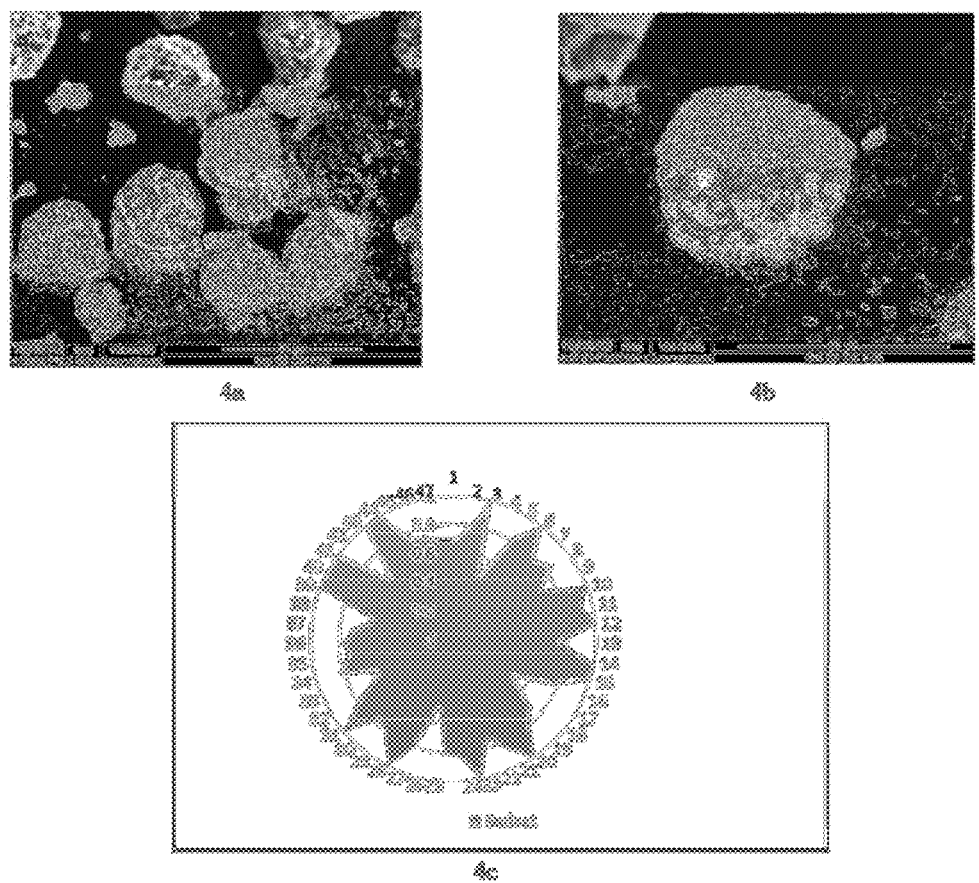

The disclosure will now be explained in relation to the non-limiting accompanying drawings, in which:

FIGS. 1a and 1b—illustrate the morphology of the pro-catalyst obtained in example 2;

FIG. 1c—illustrates the circularity of the pro-catalyst obtained in example 2;

FIGS. 2a and 2b—illustrate the morphology of the pro-catalyst obtained in example 3;

FIG. 2c—illustrates the circularity of the pro-catalyst obtained in example 3;

FIGS. 3a and 3b—illustrate the morphology of the pro-catalyst obtained in example 4;

FIG. 3c—illustrates the circularity of the pro-catalyst obtained in example 4;

FIGS. 4a and 4b—illustrate the morphology of the pro-catalyst obtained in example 5; and FIG. 4c—illustrates the circularity of the pro-catalyst obtained in example 5.

DETAILED DESCRIPTION

In one aspect of the present disclosure there is provided a single-pot multi step process for the preparation of a shape controlled pro-catalyst.

The pro-catalyst is prepared by first obtaining spheroidal magnesium alkoxide and the treating the spheroidal magnesium alkoxide with at least one transition metal tetrahalide and at least one organic modifier or with a mixture of at least one transition metal tetrahalide, at least one organic modifier and at least one inorganic modifier in the presence of at least one solvent to obtain a reaction mixture. As the temperature at which the treatment is carried out has an impact on the generation of fines and morphology of the pro-catalyst, it becomes necessary to control the temperature of the exothermic reaction mixture. The method step of obtaining the spheroidal magnesium alkoxide is carried out by reacting magnesium metal and at least one alkanol at a temperature ranging between 20° C. and the boiling point of the solvent or mixture of solvents used for the purpose. The reaction is carried out for a time period of 0.5 to 8 hours. The particle size of the spheroidal magnesium alkoxide obtained by the process of the present disclosure ranges from 10 to 25μ.

The treatment of the spheroidal magnesium alkoxide with at least one transition metal tetrahalide and at least one organic modifier or with a mixture of at least one transition metal tetrahalide, at least one organic modifier and at least one inorganic modifier in the presence of at least one solvent is carried out at a temperature in the range of 30 to 150° C. for 0.5 to 2 hours. After the completion of the reaction, the reaction mixture is cooled to 30 to 60° C. and allowed to settle. The settling of the reaction mixture results in the separation of the liquid and solids which settle at the bottom. The supernatant liquid is then decanted. To the solids remaining after decanting the supernatant, is added at least one transition metal tetrahalide, at least one solvent and optionally, at least one organic or inorganic modifier to obtain a mixture which is heated again to a temperature in the range of 30 to 150° C. for 0.5 to 2.0 hours.

To ensure complete formation of a complex of magnesium alkoxide with at least one transition metal tetrahalide and at least one modifier and obtain the shape controlled pro-catalyst, process steps of cooling, settling, decanting the supernatant and treating with a mixture of at least one transition metal tetrahalide, at least one solvent and optionally, at least one organic or inorganic modifier is carried out repeatedly.

The process of the present disclosure is characterized in that iodine is not used as an initiator for the preparation of the spheroidal magnesium alkoxide. The absence of iodine leads to the formation of a stable and infrangible spheroidal magnesium alkoxide. Further, the spheroidal magnesium alkoxide obtained by the process of the present disclosure retains its shape during its application in the preparation of a Ziegler-Natta catalyst and the polymerization of the monomers. Further, the pro-catalyst obtained by the process of the present disclosure has a particle size in the range of 10 and 35μ.

The alkanol used for the purpose of the present disclosure is selected from the group consisting of methanol, ethanol, propanol, isopropanol, butanol, isobutanol and t-butanol.

The organic modifier used in the preparation of the pro-catalyst is selected from the group consisting of ethyl benzoate, di-isobutyl phthalate and (9,9-bis (methoxymethyl)fluorine); and the inorganic modifier is selected from the group consisting of tetra ethoxy silane, cyclohexylmethyl dimethoxysilane, dicyclopentyl dimethoxysilane, isobutyl-isopropyl dimethoxy silane, n-propyltriethoxy silane, isobutyltriethoxy silane, phenyltriethoxy silane, diisopropyldimethoxy silane, diethyldimethoxy silane, diisobutyldimethoxy silane, aminopropyltriethoxy silane, diphenyldimethoxy silane and methyltrimethoxy silane.

The transition metal tetrahalide is at least one selected from the group consisting of titanium tetrachloride ($TiCl_4$), vanadium tetrachloride ($VCl_4$), silicon tetrachloride ($SiCl_4$), zirconium tetrachloride ($ZrCl_4$) and hafnium tetrachloride ($HfCl_4$).

The solvent used for the purpose of the present disclosure may be aliphatic or aromatic solvent.

The pro-catalyst obtained by the process of the present disclosure is further mixed with at least one aluminium based co-catalyst such tri-ethyl aluminum to obtain a catalyst system. The pro-catalyst obtained by the process of the present disclosure may also be mixed with at least one aluminium based co-catalyst such as tri-ethyl aluminum and at least one external donor such as p-isopropoxy ethyl benzoate and cyclohexyl methyl di-methoxy silane to obtain a catalyst system. The ratio of the elemental aluminium present in said co-catalyst and said external donor ranges from 1:1 and 1:50.

In another aspect of the present disclosure there is provided a pro-catalyst. The pro-catalyst comprises spheroidal magnesium alkoxide complexed with at least one transition metal tetrahalide and at least one said modifier. The particle size of spheroidal magnesium alkoxide is in the range of 10 to 25μ whereas the particle size of the pro-catalyst of the present disclosure is in the range of 10 and 35μ. Further, the pro-catalyst of the present disclosure is essentially devoid of iodine.

The pro-catalyst of the present disclosure may be used to prepare a catalyst system which comprises a pro-catalyst of the present disclosure and at least one aluminium based co-catalyst. Accordingly, the present disclosure also provides a catalyst system comprising pro-catalyst of the present disclosure, at least one aluminium based co-catalyst and at least one external donor. The external donor is selected from the group consisting of an organo-silane compound and aromatic ester.

In still another aspect of the present disclosure there is provided the use of the pro-catalyst of the present disclosure in the preparation of polyethylene. The process involves polymerizing an ethylene monomer using the catalyst system which comprises the pro-catalyst of the present disclosure, at least one co-catalyst and at least one external donor selected from the group consisting of an organo-silane compound and aromatic ester. The polyethylene obtained by the process of the present disclosure possesses a molecular weight in the range of 1 to 60 lacs and has a particle size in the range of 200 to 300μ.

The present disclosure is further described in the light of the following non-limiting examples which are set forth for illustration purpose only and are not to be construed for limiting the scope of the disclosure.

EXAMPLES

Example 1: Preparation of Magnesium Ethoxide

In a three neck 500 ml jacketed glass reactor 125 ml of ethanol was taken and 5 gm of magnesium metal was added at 5° C. under $N_2$ atm to obtain a mixture of magnesium metal and ethanol. The mixture was heated at a temperature of 80° C. and maintained for 4 hours with constant stirring of 150 rpm. After completion of the reaction, the reaction mixture was cooled to obtain 25 gm of magnesium ethoxide. The magnesium ethoxide was subjected for determination of particle size and shape. The particle size and the shape of the magnesium ethoxide was found to be about 15μ and spheroidal, respectively.

Example 2: Preparation of Pro-Catalyst

Synthesis of a Mono Ester Based Pro-Catalyst Using Titanium Tetrachloride (A) To 10 gm of magnesium ethoxide obtained in example 1, 30 ml mixture of $TiCl_4$ and chlorobenzene (50/50% by volume) was added under $N_2$ atmosphere at 40° C. with constant stirring of 300 RPM.

(B) 4.5 ml of ethyl benzoate was added and the temperature was increased up to 100° C. (by hot oil circulator) within 15 minutes and maintained for 60 minutes.

(C) The stirring was stopped to settle down the solid content for 15 minutes. The supernatant liquid was siphoned off.

(D) Again 230 ml of a mixture of $TiCl_4$ and chlorobenzene (50/50% by volume) was charged to the reactor under inert atmosphere at 300 RPM and the reaction mixture was kept for 60 minutes.

(E) Repeated step C (F) Repeated Step D except that 0.8 ml of benzoyl chloride was added with $TiCl_4$ and chlorobenzene and the reaction mixture was kept for 60 minutes at 100° C.

(G) The stirring was stopped and the solid was allowed to settle down for 15 minutes. The supernatant liquid was siphoned off and the solid catalyst was washed four times with n-hexane and dried under $N_2$ atm at 50° C.

(H) 11 gm of the catalyst was collected for determining the compositional characteristics and for ethylene polymerization (See FIGS. 1a, 1b and 1c and Table 1).

Example 3: Synthesis of a Diester Based Pro-Catalyst Using Titanium Tetrachloride The process for synthesis of diester catalyst is similar to the process for preparing monoester catalyst as mentioned above in Example 2 except with the following modifications.

(1) Di-isobutyl phthalate was used instead of ethyl benzoate and (2) the reaction temperature was 110° C. [instead of 100° C.] for all the process steps. 11 gm of the catalyst obtained was collected for determining the compositional characteristics and for ethylene polymerization (See FIGS. 2a, 2b and 2c and Table 1).

Example 4: Synthesis of Ethyl Benzoate-Tetra Ethoxy Silane(TEOS) Based Pro-Catalyst Using Titanium Tetrachloride (A) To 7.5 gm of magnesium alkoxide obtained in example 1, 100 ml n-decane was added under $N_2$ atmosphere at 30° C. with constant stirring of 300 RPM.

(B) 1.0 ml of ethyl benzoate and 3.2 ml TEOS was added to obtain a mixture which was stirred for 10 min.

(C) 75 ml $TiCl_4$ was charged drop wise through drop-in funnel in 30 min and then the temperature was increased up to 90° C. (by hot oil circulator) within 15 minutes and maintained for 60 minutes.

(D) After 60 min, the reaction mixture was cooled down to 30° C. and allowed to settle for 15 minutes. The supernatant liquid was siphoned off.

(E) 30 ml n-decane was charged & then 75 ml $TiCl_4$ was charged drop wise through drop-in funnel in 15 min and then the temperature was increased up to 90° C. (by hot oil circulator) within 15 minutes and then the reaction mixture was kept for 60 minutes at 90° C.

(F) Repeated step D.

(G) The solid catalyst was washed four times with n-hexane and dried under $N_2$ atm at 50° C.

(H) 8.5 gm of the catalyst was collected for determining the compositional characteristics and for ethylene polymerization. (See FIGS. 3a, 3b and 3c and Table 1)

The amount of the chemical species (Ti, Mg, Cl and Ethoxy) in the pro-catalysts was determined by UV spectroscopy, titration method and gas chromatography respectively. Particles size and size distribution were determined by laser diffraction technique. The size of particles was measured for D10, D50, D90 and mean in microns.

Example-5: Synthesis of a Diether (9,9-bis (Methoxymethyl) Fluorine Based Pro-Catalyst Using Titanium Tetrachloride The process for synthesis of diether i.e., 9,9-bis (methoxymethyl)fluorine catalyst is similar to the process for preparing monoester catalyst as mentioned above in Example 2 except with the following modifications.

(1) 9,9-bis (methoxymethyl)fluorine was used instead of ethyl benzoate and (2) the reaction temperature was 110° C. [instead of 100° C.] for all the process steps. 11 gm of the catalyst obtained was collected for determining the compositional characteristics and for ethylene polymerization (See FIGS. 4a, 4b and 4c and Table 1).

TABLE 1

The compositional analysis, morphology and circularity of the pro-catalysts

| Ex No | Modifier | Chemical composition (wt %) | | | | | Mean PSD (μm) | Ti metal (M1) (wt %) | Circularity |
|---|---|---|---|---|---|---|---|---|---|
| | | Ti | Mg | Cl | Modifier | Ethoxy | | | |
| 2 | Ethyl benzoate | 2.5 | 18.8 | 77.5 | 15.9 | 0.29 | 24 | 3.6 | 0.7 |
| 3 | Di-isobutyl phthalate | 2.6 | 19.9 | 76.3 | 12 | 0.3 | 19 | 3.7 | 0.69 |
| 4 | Ethyle Benzoate-Tetra ethoxy Silane | 5.7 | 19.5 | 71.5 | 7.5 | 1.8 | 29 | 8.7 | 0.47 |
| 5 | 9, 9-bis (methoxymethyl) fluorine | 2.5 | 17.0 | 43.1 | 13.2 | 0.31 | 35 | 3.7 | 0.71 |

Example 6: Polymerization Performance & Product Characterization of Modified Process Ethylene slurry polymerization was carried out in 4 lit SS high pressure reactor at 400 rpm using triethyl aluminium as co catalyst, n-hexane as a solvent and at 6.0 kg/cm2 ethylene pressure for 120 minutes at 80° C. temperature. The polymer obtained after cooling the reactor was washed and dried and quantified for determination of catalyst activity. The polymer was also characterized for viscosity, avg. molecular wt, APS, BD and Thermal characteristics. The morphology of the polymer resin was determined by scanning electron microscopy. Table 2 shows the results of Polymerization of the catalyst of the present disclosure.

TABLE 2

Pro-catalyst Polymerization Performance.

| Example | Modifier | ID1 (wt %) | ED1 | H2 mmol | Al/Ti | Al/D | Activity (KgPP/g cat) | MW (Mv) Million | APS (μ) | BD (g/cc) | Melting Tem (Tm °C.) | Crystallization (Tc °C.) | % Crystanality |
|---|---|---|---|---|---|---|---|---|---|---|---|---|---|
| 2 | EB | 15.9 | — | 0 | 250 | 0 | 8.5 | 1.7 | 259 | 0.40 | 136.4 | 114.1 | 41.8 |
| | | | Mixed | 0 | 250 | 5 | 4.3 | 5.1 | 231 | 0.40 | 133.7 | 114.0 | 39.9 |
| | | | | 9.5 | 250 | 5 | 7.2 | 1.1 | 242 | 0.43 | 133.3 | 113.6 | 46.4 |
| | | | | 18.9 | 250 | 5 | 5.7 | 0.6 | 217 | 0.37 | 134.7 | 113.6 | 46.3 |
| 3 | DIBP | 12.0 | — | 0 | 100 | — | 4.4 | 6.5 | 208 | 0.33 | 133.4 | 115.1 | 29.5 |
| | | | | 9.5 | 100 | — | 7.5 | 0.8 | 171 | 0.14 | 134.7 | 115.0 | 42.3 |
| | | | | 18.9 | 100 | — | 10.8 | 0.6 | 376 | 0.46 | 135.0 | 114.8 | 44.8 |

TABLE 2-continued

Pro-catalyst Polymerization Performance.

| Example | Modifier | ID1 (wt %) | ED1 | H2 mmol | Al/Ti | Al/D | Activity (KgPP/ g cat) | MW (Mv) Million | APS (μ) | BD (g/cc) | Melting Tem (Tm ° C.) | Crystal- lization (Tc ° C.) | % Crystanality |
|---|---|---|---|---|---|---|---|---|---|---|---|---|---|
| 4 | EB/TEOS | 7.5 | — | 0 | 250 | — | 15.5 | 1.1 | 330 | 0.29 | 136.4 | 113.5 | 36.6 |
|   |          |     | Mixed | 0 | 250 | 250 | 12.9 | 4.4 | 457 | 0.28 | 135.7 | 112.9 | 49.2 |
| 5 | DE | 13.2 | — | 0 | 100 | — | 8.2 | 3.6 | 178 | 0.38 | 133.4 | 113.6 | 33.8 |
|   |    |      |   | 9.5 | 100 | — | 9.3 | 0.9 | 178 | 0.37 | 134.4 | 113.8 | 46.7 |
|   |    |      |   | 18.9 | 100 | — | 8.6 | 0.6 | 265 | 0.37 | 133.5 | 113.8 | 50.2 |

MW: Viscosity Average Molecular Weight
APS: Average Particle Size
BD: Bulk Density Technical Advancement and Economic Significance The present disclosure has the following advantages:

The present disclosure provides a process for the synthesis of a catalyst having narrow particle size distribution with morphological modified particles, The polymer obtained by the process of the present disclosure possesses good particle size distribution of resin, better flowability, improved morphology and bulk density, and The catalyst system of the present disclosure has the potential to prepare ultrahigh density polyethylene.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A single-pot multi step process for the preparation of a shape controlled iodine free pro-catalyst; said process comprising the following steps:
   i. reacting magnesium metal and at least one alkanol at a temperature in the range of 20° C. to the boiling point of the alkanol used for 0.5 to 8 hrs to obtain spheroidal magnesium alkoxide in the presence of at least one solvent;
   ii. treating the spheroidal magnesium alkoxide with at least one transition metal tetrahalide, at least one organic modifier, and optionally, at least one in-organic modifier in the presence of at least one solvent to obtain a reaction mixture;
   iii. cooling, settling the reaction mixture and decanting the supernatant;
   iv. adding at least one transition metal tetrachloride, at least one solvent and optionally, at least one organic or inorganic modifier; and
   v. iterating steps (iii) and (iv) to obtain the shape controlled pro-catalyst.

2. The process as claimed in claim 1, wherein steps (ii) and (iv) are carried out at a temperature in the range of 30 to 150° C. for 0.5 to 2 hrs.

3. The process as claimed in claim 1, wherein the reaction mixture is cooled to a temperature of 30 to 60° C.

4. The process as claimed in claim 1, wherein the alkanol is selected from the group consisting of methanol, ethanol, propanol, isopropanol, butanol, isobutanol and t-butanol.

5. The process as claimed in claim 1, wherein the particle size of the spheroidal magnesium alkoxide ranges between 10 and 25μ.

6. The process as claimed in claim 1, wherein the particle size of the procatalyst ranges between 10 and 35μ.

7. The process as claimed in claim 1, wherein the organic modifier of step (ii), of step (iv) or of both steps (ii) and (iv) is selected from the group consisting of ethyl benzoate, di-isobutyl phthalate and 9, 9-bis (methoxymethyl) fluorene.

8. The process as claimed in claim 1, wherein the inorganic modifier of step (ii), of step (iv) or of both steps (ii) and (iv) is selected from the group consisting of tetra ethoxy silane, cyclohexylmethyl dimethoxysilane, dicyclopentyl dimethoxysilane, isobutylisopropyl dimethoxy silane, n-propyltriethoxy silane, isobutyltriethoxy silane, phenyltriethoxy silane, diisopropyldimethoxy silane, diethyldimethoxy silane, diisobutyldimethoxy silane, aminopropyltriethoxy silane, diphenyldimethoxy silane and methyltrimethoxy silane.

9. The process as claimed in claim 1, wherein the transition metal tetrachloride is selected from the group consisting of titanium tetrachloride (TiCl$_4$), vanadium tetrachloride (VCl$_4$), silicon tetrachloride (SiCl$_4$), zirconium tetrachloride (ZrCl$_4$) and hafnium tetrachloride (HfCl$_4$).

10. The process as claimed in claim 1, wherein the solvent of step (ii), of step (iv) or of both steps (ii) and (iv) is selected from the group consisting of aliphatic and aromatic solvent.

11. The process as claimed in claim 1, further comprises a method step of mixing at least one aluminum based co-catalyst to obtain a catalyst system, said co-catalyst being tri-ethyl aluminum.

12. The process as claimed in claim 11, further comprises a method step of mixing at least one external donor; said external donor being selected from the group consisting of p-isopropoxy ethyl benzoate and cyclohexyl methyl di-methoxy silane, wherein the molar ratio of said elemental aluminum present in said co-catalyst and said external donor ranges from 1:1 to 1:50.

13. A pro-catalyst obtained by the process as claimed in claim 1; said pro-catalyst comprising spheroidal magnesium alkoxide having particle size in the range of 10 to 25μ, complexed with said transition metal tetrahalide and at least one said modifier, wherein, said pro-catalyst is devoid of elemental iodine and the particle size of said pro-catalyst ranges between 10 and 35μ.

14. A catalyst system comprising:
i. the pro-catalyst of claim 13,
ii. at least one aluminum based co-catalyst, and
iii. optionally, at least one external donor.

15. A catalyst system comprising: i. a pro-catalyst comprising spheroidal magnesium alkoxide having particle size in the range of 10 to 25μ, complexed with said transition metal tetrahalide, at least one organic and optionally at least one inorganic modifier, and ii. at least one aluminum based co-catalyst,
wherein, said pro-catalyst is devoid of elemental iodine and the particle size of said pro-catalyst ranges between 10 and 35μ.

16. A process for the preparation of polyethylene, said process comprising the following steps:
i. mixing the pro-catalyst as claimed in claim 13, at least one aluminum based co-catalyst and optionally, at least one external donor selected from the group consisting of an organo-silane compound and aromatic ester to obtain a catalyst system, wherein the molar ratio of the elemental aluminum, present in said co-catalyst to the external donor ranges from 1:1 to 1:50, and
ii. polymerizing an ethylene monomer in the presence of the catalyst system to obtain polyethylene having a molecular weight in the range of 1 to 60 lac and the particle size in a range of 200 to 300μ.

* * * * *